United States Patent [19]

Shivarov et al.

[11] Patent Number: 4,744,266
[45] Date of Patent: May 17, 1988

[54] MANIPULATOR MODULE

[75] Inventors: Nedko S. Shivarov; Gencho S. Stainov; Todor N. Todorov, all of Sofia, Bulgaria

[73] Assignee: Institute Po Technicheska Kibernetika, Sofia, Bulgaria

[21] Appl. No.: 8,694

[22] Filed: Jan. 30, 1987

[30] Foreign Application Priority Data

Jan. 30, 1986 [BG] Bulgaria .................................. 73311

[51] Int. Cl.<sup>4</sup> .............................................. B25J 9/08
[52] U.S. Cl. ...................... 74/526; 192/149; 403/113; 403/117; 901/13
[58] Field of Search ............... 414/680, 744 R, 744 A; 901/11, 12, 13, 28; 403/113, 117; 74/526; 192/149

[56] References Cited

U.S. PATENT DOCUMENTS

| | | | |
|---|---|---|---|
| 3,717,231 | 2/1973 | Kaufeldt | 192/149 X |
| 4,595,335 | 6/1986 | Takahashi | 901/11 X |
| 4,606,667 | 8/1986 | Bailey | 901/11 X |
| 4,637,775 | 1/1987 | Kato | 414/744 R |

FOREIGN PATENT DOCUMENTS 502803 3/1939 United Kingdom ................ 403/117

Primary Examiner—Robert J. Spar
Assistant Examiner—Donald W. Underwood
Attorney, Agent, or Firm—Klein and Vibber

[57] ABSTRACT

A manipulator module comprises an arm bearingly mounted on an axle, confined between left and right adjustable stops with a suitably completed fixing surface. On the arm are stationary mounted hard stops with slits, charged with helical cylindric springs. The springs contact the adjustable stops when the arm approaches the respective stop. Onto parallel guideways, formed by the stationary stops with slits, roll the extreme bearings of a three bearing bearings block, the intermediate bearing of which contacts the fixing surface of the respective stop while the mover is at "on" position. When the arm has reached the stop and has deformed the spring, the "fix" mover is actuated, the arm is fixed to the stop and the energy lost during the arm's movement is added.

6 Claims, 2 Drawing Sheets

MANIPULATOR MODULE

BACKGROUND OF THE INVENTION

The invention relates to a manipulator module with application in robotics.

A manipulator module is disclosed in Bulgarian Author's Certificate No. 37268. The known manipulator module comprises an arm bearingly mounted on an axis and confined between adjustable left and right stops with immovable stops pins, elastic elements in the shape of helical cylindric springs fixed to the arm and to a bearingly mounted bar with a capability for contact on the pins of the left and right sop, as well as a "fix" mover stationarily mounted on the arm and rotary, by means of bars, to fixtures contacting the respective stop's pin at the arm's terminal position.

A disadvantage of the known manipulator module is its complicated construction and low accuracy performance generating from the radial clearance of the fixture unit.

An object of the present invention is to create a manipulator module with a simplified construction and enhanced accuracy.

SUMMARY OF THE INVENTION

The present invention presents a manipulator module comprising an arm bearingly mounted to an axle, confined between adjustable left and right stops fixed around the axle and provided with immovable stop pins. In the arm is situated at least one helical cylindric spring bound to the arm and a "fix" mover, mounted stationary to the arm. According to the invention, the helical cylindric springs lie with both ends fixed to the arm by hard stops, each hard stop having a slit. The right and left stop pins, which contact the right and left end of the springs, are mounted with a "pass through every slit" capability. The adjustable stops are each furnished with a fixing surface onto which contacts the intermediate bearing of three bearings which are connected in a bearings block by means of a common bearing axle. The other two outer bearings of the block contact onto parallel guidelines mounted stationary on the arm. The bearings block is linked by its axle with the "fix" mover. At left (right) position of the arm and "on" position of the "fix" mover, the fixing surface of the left (right) adjustable stop is in constant contact with the intermediate bearing of the bearings block and the pin of the left (right) stop contacts and left (right) end of the spring.

An advantage of the present invention is the simplified construction of the module and the enhanced accuracy of positioning, resulting from the unilateral sweeping off the clearance of the fixture unit under the spring force action.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENT

Figure 1:
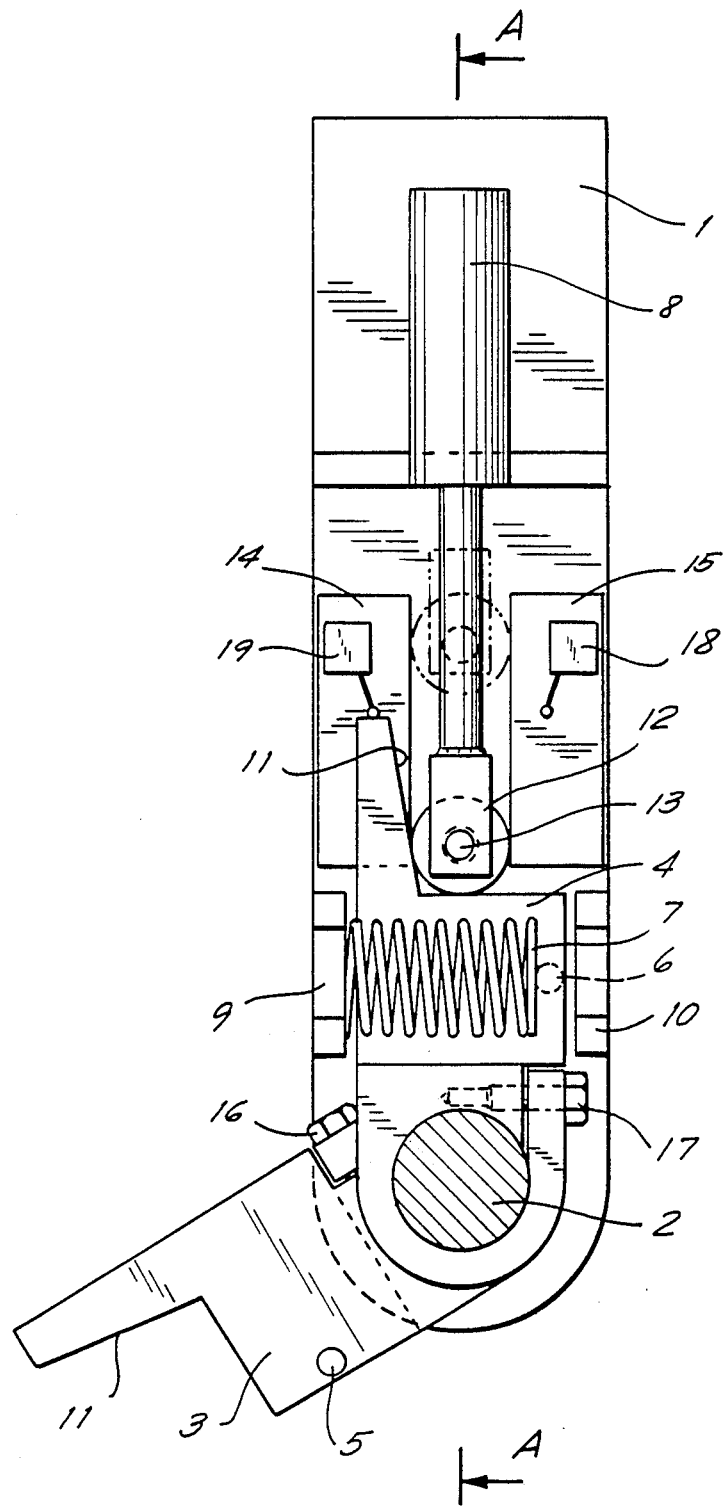
FIG. 1 is a top plan view of the module.
Figure 2:
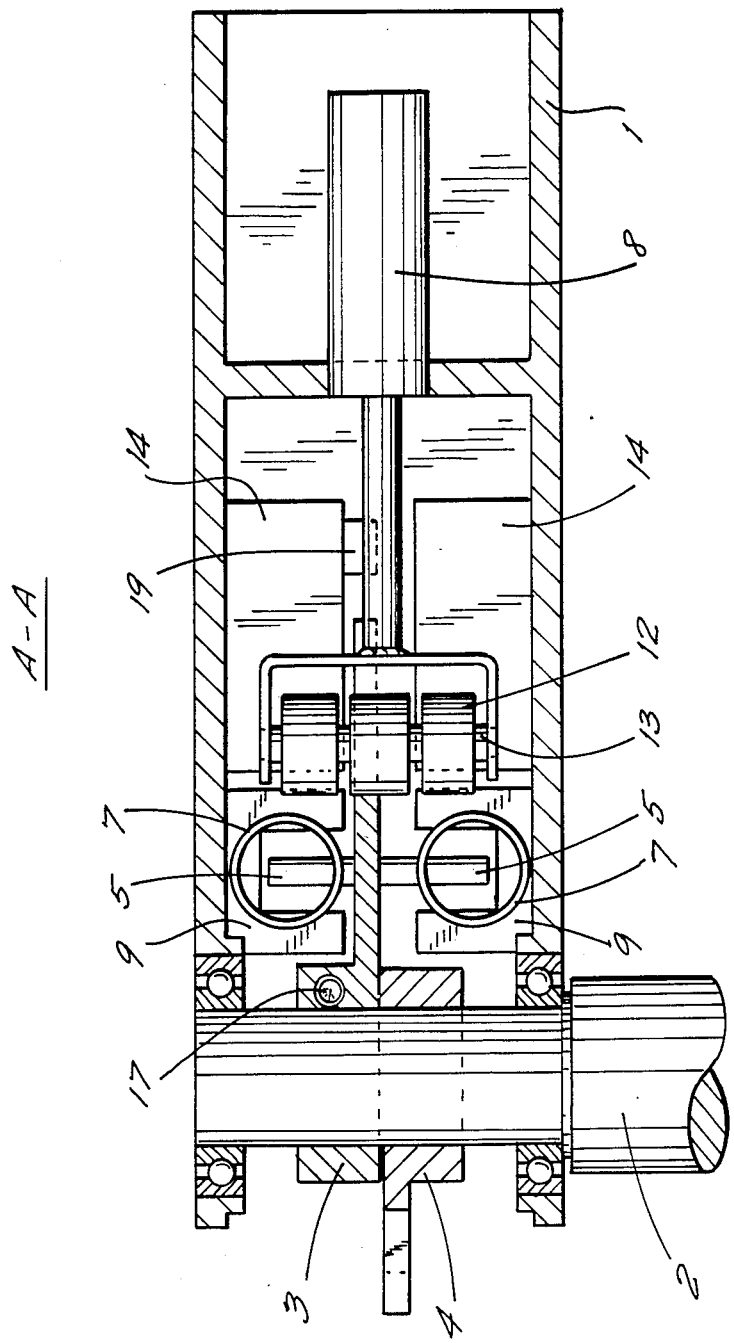
FIG. 2 is a side elevation view along section A—A from FIG. 1.

Referring to FIGS. 1 and 2, the manipulator module comprises an arm 1, comprising two parallel plates—interlinked. The arm 1 is bearingly mounted on axle 2, where adjustable left and right stops 3 and 4 are fixed to the axle by bolts 16, 17. The adjustable stops 3, 4 are provided with immovable pins 5 and 6, respectively. Within arm 1, accumulating elastic elements in the shape of two helical cylindric springs 7 are fixed. Along the arm's axis, a "fix" mover 8 is mounted. Springs 7 lie with both their ends on hard stops 9 and 10 fixed to the arm 1. The hard stops are provided with slits. The pins 5 and 6 pass freely through the slits of the hard stops 9 and 10, respectively.

A bearing block 12 (FIG. 2) consists of three bearings connected to a common bearing axle 13. The bearing axle 13 of the bearings block 12 is linked to the "fix" mover 8. The two extreme (outer) bearings of the bearings block 12 contact parallel guideways 14 and 15, stationary fixed to the arm 1. The adjustable stops 3 and 4 are furnished with a fixing surface 11, onto which contacts the intermediate bearing from the bearings block 12 when the "fix" mover 8 is at "on" position. At left (right) position of the arm 1 and "on" position of the "fix" mover 8, the fixing surface 11 of the left (right) adjustable stop 3, 4 contacts the left (right) end of the springs 7 by means of the stop's pin 5, 6.

On the arm 1 are mounted stationary limit switches 18, 19, which can be actuated by the adjustable stops 3, 4.

The manipulator module operates as follows:

When in the initial position, arm 1 is blocked to axle 2 by the left adjustable stop 3, the stop's pin 5 lying on the left end of spring 7. Simultaneously, arm 1 is being pressed by the springs 7 by means of the hard stop with slit 10, the parallel guideway 14 and the bearings block 12 onto the fixing surface 11.

In this position, the "fix" mover 8 thrusts the bearings block 12 to forward end position. When withdrawing the "fix" mover 8 in back end position the intermediate bearing of the bearings block 12 ceases contacting the fixing surface 11 of the adjustable stop 3. As a result of the tensioned spring's 7 action, the arm 1 rotates towards the adjustable stop 4. When the arm 1 reaches the stop 4, pin 6 and the right end of the springs 7 get into contact, the latter being deformed.

The limit switch 18 actuates the "fix" mover 8 which thrusts forward the bearings block 12. The intermediate bearing of the bearings block 12 contacts the fixing surface 11 of the adjustable stop 4. During movement of the bearings block 12 to forward and position, additional deformation of the springs takes place; the energy, which has been wasted during the movement of the arm (1), being added. This is the position shown in FIG. 1.

The reverse movement of the arm 1 is carried out in a similar way.

Although the invention is described and illustrated with reference to a single embodiment thereof, it is to be expressly understood that it is in no way limited to the disclosure of such preferred embodiment but is capable of numerous modifications within the scope of the appended claims.

We claim:

1. A manipulator module comprising,
an arm bearingly mounted on an axle;

left and right adjustable stops mounted on said axle, movement of said arm being confined by said adjustable stops, each of said stops being provided with a fixing surface;

a plurality of hard stops mounted on said arm, said hard stops being charged with spring means;

said spring means contacting one of said respective left and right adjustable stops when the arm approaches the respective adjustable stop;

a fix mover movably mounted to said arm and provided with a bearings block at one end, said bearings block being provided with a bearing;

means for actuating said fix mover;

such that when said arm has reached one of said respective left and right adjustable stops, said fix mover is moved and presses said bearing against the respective fixing surface of said respective adjustable stop and thereby pressing said adjustable stop causes said adjustable stop to deform said spring means.

2. A manipulator module as claimed in claim 1, further comprising said bearings block being provided with two outer bearings surrounding said bearing and coaxially mounted with said bearing; and a pair of parallel guideways mounted in said arm, upon which said outer bearings roll when said fix mover is moved.

3. A manipulator module as claimed in claim 1, further comprising said hard stops each being provided with a slit;

said adjustable stops each being provided with a pin;

such that when said arm approaches one of said respective left and right adjustable stops, the respective pin provided on each of said adjustable stops passes through one of the slits provided on each of said hard stops and said pin deforms said spring means.

4. A manipulator module as claimed in claim 1, wherein said means for moving said fix mover includes a limit switch, said limit switch being activated by contact with said left and right adjustable stops.

5. A manipulator module as claimed in claim 1, wherein said spring means comprises a helical cylindrical spring.

6. A manipulator module as claimed in claim 2, wherein said parallel guideways are formed by said hard stops.

* * * * *

UNITED STATES PATENT AND TRADEMARK OFFICE
CERTIFICATE OF CORRECTION

PATENT NO. : 4,744,266
DATED : May 17, 1988
INVENTOR(S) : Nedko St. SHIVAROV et al.

It is certified that error appears in the above-identified patent and that said Letters Patent are hereby corrected as shown below:

Title page:

Kindly amend the name of the Assignee

From: "Institute Po Technicheska Kibernetika"
To: --Institute Po Technicheska Kibernetika I Robotika--

Signed and Sealed this

First Day of November, 1988

*Attest:*

DONALD J. QUIGG

*Attesting Officer*   *Commissioner of Patents and Trademarks*